(12) United States Patent
Naylor

(10) Patent No.: US 9,928,707 B2
(45) Date of Patent: Mar. 27, 2018

(54) SURVEILLANCE SYSTEM

(75) Inventor: Matthew John Naylor, Crawley Down (GB)

(73) Assignee: GARRETT THERMAL SYSTEMS LIMITED, Berkshire (GB)

( * ) Notice: Subject to any disclaimer, the term of this patent is extended or adjusted under 35 U.S.C. 154(b) by 584 days.

(21) Appl. No.: 14/118,211

(22) PCT Filed: May 16, 2012

(86) PCT No.: PCT/AU2012/000539
§ 371 (c)(1),
(2), (4) Date: Feb. 24, 2014

(87) PCT Pub. No.: WO2012/155200
PCT Pub. Date: Nov. 22, 2012

(65) Prior Publication Data
US 2014/0160294 A1    Jun. 12, 2014

(30) Foreign Application Priority Data

May 16, 2011   (AU) ................................ 2011901868

(51) Int. Cl.
*H04N 7/00*    (2011.01)
*G08B 13/196*  (2006.01)
*H04N 7/18*    (2006.01)

(52) U.S. Cl.
CPC ... *G08B 13/19602* (2013.01); *G08B 13/1961* (2013.01); *G08B 13/19606* (2013.01); *H04N 7/18* (2013.01)

(58) Field of Classification Search
CPC ........ G08B 13/19602; G08B 13/19634; G08B 13/19606; H04N 7/188; H04N 5/144
(Continued)

(56) References Cited

U.S. PATENT DOCUMENTS 5,790,181 A   8/1998   Chahl et al.
5,936,666 A   8/1999   Davis
(Continued)

FOREIGN PATENT DOCUMENTS

EP    176483        3/2007
WO    2012155200 A1 11/2012

OTHER PUBLICATIONS

Extended European Search Report dated Oct. 30, 2014; in corresponding European patent application No. 12785369.5.
(Continued)

*Primary Examiner* — William C Vaughn, Jr.
*Assistant Examiner* — Daniel Tekle
(74) *Attorney, Agent, or Firm* — Polsinelli PC

(57) ABSTRACT

A surveillance system (10) for monitoring movement in a region of interest (18) is described. The surveillance system (10) includes: An image capturing system (12) having a field of view (16) including a region of interest (18), and adapted to capture an image of the region of interest (18). An image processing system (78) configured to process a time-sequential series of images of the field of view from the image capturing system such that at least a portion (52, 53, 54) of each processed image (50) is analyzed for detecting movement within the region of interest (18). The image capturing system (12) is configured to capture, in each image, different apparent magnifications of respective zones (20, 22, 24) within the region of interest (18) in the field of view (16) that are at different distances from the image capturing system (12) such that an object (60) in at least one position in at least two of said zones has substantially the same apparent size in the images.

20 Claims, 3 Drawing Sheets

(58) Field of Classification Search
USPC .......................................................... 348/155
See application file for complete search history.

(56) References Cited

U.S. PATENT DOCUMENTS

| | | | |
|---|---|---|---|
| 7,242,423 B2* | 7/2007 | Lin | ................... H04N 7/181 |
| | | | 348/169 |
| 2008/0211916 A1* | 9/2008 | Ono | ................ G08B 13/19608 |
| | | | 348/164 |
| 2009/0073254 A1 | 3/2009 | Li et al. | |
| 2009/0080695 A1 | 3/2009 | Yang | |
| 2010/0002070 A1 | 1/2010 | Ahiska | |
| 2010/0002071 A1* | 1/2010 | Ahiska | ................... H04N 5/217 |
| | | | 348/36 |
| 2010/0265331 A1* | 10/2010 | Tanaka | ............. G08B 13/19602 |
| | | | 348/159 |

OTHER PUBLICATIONS

International Search Report for International Application No. PCT/AU2012/000539 dated May 30, 2012.
Written Opinion of the International Searching Authority for International Application No. PCT/AU2012/000539 dated May 30, 2012.

* cited by examiner

SURVEILLANCE SYSTEM

CROSS-REFERENCE TO RELATED APPLICATIONS

This application is a national stage entry of PCT/AU2012/000539 filed May 16, 2012, which claims priority to AU 2011901868, which was filed on May 16, 2011, each of the said applications are expressly incorporated herein in their entirety.

FIELD OF THE INVENTION

The present invention relates to methods and systems for surveillance. In one aspect, the invention relates to the use of cameras in surveillance.

BACKGROUND OF THE INVENTION

Video Motion Detection (VMD) may be used for surveillance applications such as for perimeter protection and intrusion detection. It uses a computer to analyse a video sequence of the perimeter of a property, and provides notification which may include an alarm, if an intruder appears in the scene. Typically, such a system will operate in the near field, covering an area from a few meters in front of the camera to 30 meters away. The image has enough resolution to readily distinguish subjects in the near field, and barely sufficient resolution to distinguish objects at 30 meters or more.

To resolve objects that are further away, higher resolution cameras may be used to capture an image at a higher optical resolution. While the resolution of an image may be improved by software after the image has been captured, the end resolution is ultimately limited by the optical resolution at which the image is captured, which is a function of the camera optics and the image sensor that captures the image. For a given optical magnification of an image, an increase in optical resolution requires a more expensive image sensor, having an increase in sensor density and a corresponding increase in data. Similarly, an increase would occur if the end resolution were increased by software. The increase in data takes more processing to compress, send, and analyse. As a result, the rate at which video frames can be processed on modest hardware drops as the resolution increases. In security applications, since it is desirable to sense vehicles or fast running intruders that quickly cross the field of view; a high frame rate is desirable. This means that only low or medium resolution images can be analysed quickly enough on modest hardware to be useful in security applications.

Long range VMD can be effected by using a telephoto lens on the camera. However, the short range coverage is sacrificed to achieve this due to the narrow field of view of a telephoto lens. Furthermore, it is easy for an intruder in the foreground to obscure the view of the camera without the identity of the intruder or nature of the obscuration being evident from the video.

Long range Passive Infrared (PIR) devices have been developed to detect intruders over a range from a few meters to 150 meters away. PIR detectors have a pair of sensors that measure an intensity level of infrared radiation, and based on the shift in intensity level from one sensor to the other, determine whether moving infrared radiation is present and if an alarm condition is met. These detectors are very effective at detecting moving infrared radiation at the different ranges, but as the detection is of a pair of intensity levels only, the PIR does not know the shape of the object that causes a shift in intensity levels. Therefore, PIR alone can false alarm on animals such as foxes, rabbits and deer, and a typical installation requires a camera capable of zooming in on the area that causes an alarm to verify that the alarm condition is correct.

PIR detectors may be complemented with video cameras to allow video verification. Installing a PIR and a video camera with zoom capability as a complementary pair suffers from alignment issues since the PIR and the camera need to point at the same zones so that an operator can verify a PIR alarm quickly. In practice, it is difficult for an installer to align the two sensors. As a result, it is possible for a PIR alarm to be triggered in an area that the camera cannot see. U.S. Pat. No. 5,936,666 describes the collocation of two sensors in the same enclosure to overcome the issue of alignment of the fields of view of the two sensors during installation.

It is an object of the invention to at least in part alleviate one or more of the above-described limitations with known surveillance systems that rely on VMD and/or PIR devices.

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

The invention provides in one aspect, a surveillance system for monitoring movement in a region of interest, said surveillance system including: an image capturing system having a field of view including a region of interest, and adapted to capture an image of the region of interest; wherein the image capturing system is configured such that each image includes at least two portions, having different apparent magnifications of respective zones within the region of interest in the field of view that are at different distances from the image capturing system an image processing system configured to process a time-sequential series of images of the field of view from the image capturing system such that at least a portion of each processed image is analysed for detecting movement within the region of interest whereby an object's motion is tracked as it passes from one zone to another.

In another aspect of the present invention, there is provided a surveillance system for monitoring movement in a region of interest, said surveillance system including: an image capturing system having a field of view including a region of interest, and adapted to capture an image of the region of interest wherein the image capturing system is configured such that each image includes at least two portions, having different apparent magnifications for at least a pair of corresponding zones within the region of interest in the field of view that are at different distances from the image capturing system, such that an object in a first position in a first zone will appear in an image as having substantially the same size that an image of the object would if the object were in a second position in a second zone, said first and second positions being at different distances from the image capturing system; an image processing system configured to process a time-sequential series of images of the field of view from the image capturing system such that at least a portion of each processed image is analysed for detecting movement within the region of interest.

In a further aspect of the present invention, there is provided a surveillance system for monitoring movement in a region of interest, said surveillance system including: an image capturing system having a field of view including a region of interest, and adapted to capture an image of the region of interest, wherein the image capturing system is configured such that each image includes at least two portions, having different apparent magnifications for at least a pair of corresponding zones within the region of interest in the field of view that are at different distances from the image capturing system, said zones being partly non-overlapping; an image processing system configured to process a time-sequential series of images of the field of view from the image capturing system such that at least a portion of each processed image is analysed for detecting movement within the region of interest.

In yet another aspect of the present invention, there is provided a surveillance system for monitoring movement in a region of interest, said surveillance system including: an image capturing system having a field of view including a region of interest, and adapted to capture an image of the region of interest, wherein the image capturing system is configured such that each image includes at least two portions having different apparent magnifications for at least a pair of corresponding zones within the region of interest in the field of view that are at different distances from the image capturing system, said image capturing system being configured such that a relative location, geometry of the zones and the corresponding apparent magnification of images of the zones are chosen such that a motion of an object within a plurality of zones results in a predetermined limited variation in the size of an image of the object; an image processing system configured to process a time-sequential series of images of the field of view from the image capturing system such that at least a portion of each processed image is analysed for detecting movement within the region of interest.

Preferably, the image processing system is configured such that an object's motion can be tracked as it passes from one zone to another. In a particularly advantageous embodiment, the corresponding apparent magnification of images of the zones are chosen such that a motion of an object within a plurality of zones results in a predetermined limited variation in the size of an image of the object.

The predetermined limited variation is preferably chosen such that an image of an object is sufficiently large to enable detection of the presence of the object, in a portion of the image corresponding to a new zone of the region of interest when the object moves into the new zone. In an embodiment, the predetermined limited variation is chosen such that an image of an object is sufficiently large to enable identification the object in a portion of the image corresponding to a new zone of the region of interest when the object moves out of a previous zone.

The image capturing system, in an embodiment, includes a plurality of cameras, each camera having a field of view that covers part of the field of view of the image capturing system, said cameras being further configured to capture at least one respective portion of the image of the region of interest at at least one corresponding respective apparent magnification. In an embodiment, the image capturing system includes means to combine images from the plurality of cameras to generate the image of the of the region of interest.

In an embodiment, the image capturing system includes a sensor having a plurality of sensor elements, wherein different sets of sensor elements correspond to different portions of an image to be captured at a corresponding apparent magnification, and wherein the image capturing system is arranged to selectively process data from sensor elements within each set of sensor elements according to the apparent magnification of the portion of the image.

In an embodiment, the image capturing system is arranged to read outputs from sensor elements within a set according to a predefined number or pattern to create a portion of the image with a predetermined apparent magnification.

In an embodiment, the image capturing system is arranged to combine outputs from a plurality of sensor elements within a set according to a predefined scheme to create a portion of the image with a predetermined apparent magnification.

In yet another aspect of the present invention, there is provided a camera for capturing an image for monitoring a region of interest, the camera including: an image capturing system having a field of view including a region of interest, and adapted to capture an image of the region of interest, wherein the image capturing system is configured such that each image includes at least two portions, having different apparent magnifications for at least a pair of corresponding zones within the region of interest in the field of view that are at different distances from the image capturing system, such that an object in a first position in a first zone will appear in an image as having substantially the same size that an image of the object would if the object were in a second position in a second zone, said first and second positions being at different distances from the image capturing system.

In a further aspect of the present invention, there is provided a camera for capturing an image for monitoring a region of interest, the camera including: an optical system which presents an image of a field of view that includes a region of interest; and a sensor adapted to capture at least a portion of the presented image; wherein the presented image includes a first magnification of a first zone within of the region of interest, and a second magnification, that is less than the first magnification of at least a second zone within of the region of interest, wherein the first zone within of the region of interest is further from the camera than the second zone within of the region of interest.

The camera in either of the above two aspects of the invention may, advantageously, be configured to form part of a surveillance system of a type herein described.

In yet another aspect of the present invention, there is provided a method for monitoring a region of interest in a field of view, the method including: capturing with an imaging device a time-sequential series of images of the region of interest including capturing, in each image, different apparent magnifications of respective zones within the region of interest in the field of view that are at different distances from the image capturing system; processing the captured images such that at least a portion of each processed image is analysed for detecting movement within the region of interest such that an object's motion can be tracked as it passes from one zone to another.

In a further aspect of the present invention, there is provided a method for monitoring a region of interest in a field of view, the method including: arranging an image capturing system with respect to the region of interest such that at least a pair of corresponding zones within the region of interest in the field of view are at different distances from the image capturing system; capturing with an imaging device a time-sequential series of images of the region of interest including capturing, in each image, different apparent magnifications of respective zones within the region of interest in the field of view that are at different distances from the image capturing system in a manner such that an object in a first position in a first zone will appear in an image as having substantially the same size that an image of the object would if the object were in a second position in a second zone, said fat and second positions being at different distances from the image capturing system; processing the captured images such that at least a portion of each processed image is analysed for detecting movement within the region of interest.

In yet another aspect of the present invention, there is provided a method for monitoring a region of interest in a field of view, the method including: capturing with an imaging device a time-sequential series of images of the region of interest including capturing, in each image, different apparent magnifications of respective zones within the region of interest in the field of view that are at different distances from the image capturing system such that at least a pair of corresponding zones within the region of interest are partly non-overlapping; processing the captured images such that at least a portion of each processed image is analysed for detecting movement within the region of interest In yet another aspect of the present invention, there is provided a method for monitoring a region of interest in a field of view, the method including: arranging an image capturing system having a field of view such that it includes the region of interest, and the image capturing system is adapted to capture an image of the region of interest, wherein the image capturing system is configured such that each image includes at least two portions having different apparent magnifications for at least a pair of corresponding zones within the region of interest in the field of view that are at different distances from the image capturing system, said image capturing system being configured such that a relative location, geometry of the zones and the corresponding apparent magnification of images of the zones are chosen such that a motion of an object within a plurality of zones results in a predetermined limited variation in the size of an image of the object; capturing with an imaging device a time-sequential series of images of the region of interest including capturing, in each image, different apparent magnifications of respective zones in the field zones within the region of interest in the field of view that are at different distances from the image capturing system; and processing the captured images such that at least a portion of each processed image is analysed for detecting movement within the region of interest.

In another aspect of the present invention, there is provided a method for monitoring a region of interest in a field of view, the method including: capturing with an imaging device a time-sequential series of images of the region of interest including capturing, in each image, different apparent magnifications of respective zones within the region of interest in the field of view that are at different distances from the image capturing system, such that an object maintains a relatively constant size in an image irrespective of its location in the region of interest; processing the captured images such that at least a portion of each processed image is analysed for detecting movement within the region of interest.

Also disclosed herein, is a surveillance system for monitoring movement in a region of interest, said surveillance system including: an image capturing system having a field of view including a region of interest, and adapted to capture an image of the region of interest; an image processing system configured to process a time-sequential series of images of the field of view from the image capturing system such that at least a portion of each processed image is analysed for detecting movement within the region of interest; wherein the image capturing system is configured to capture, in each image, different apparent magnifications of respective zones within the region of interest in the field of view that are at different distances from the image capturing system such that an object in at least one position in at least two of said zones has substantially the same apparent size in the images.

Further disclosed herein is a method for monitoring a region of interest in a field of view, the method including: capturing with an imaging device a time-sequential series of images of the region of interest including capturing, in each image, different apparent magnifications of respective zones within the region of interest in the field of view that are at different distances from the image capturing system; processing the captured images such that at least a portion of each processed image is analysed for detecting movement within the region of interest.

Also disclosed herein is a camera for capturing an image for monitoring a region of interest, the camera including: an image capturing system having a field of view including a region of interest, and adapted to capture an image of the region of interest; wherein the image capturing system is configured to capture, in each image, different apparent magnifications of respective zones within the region of interest in the field of view that are at different distances from the image capturing system.

In an embodiment of the invention, the image capturing system further includes an optical system that delivers the image to be captured to the image capturing system, the optical system magnifying at least a portion of the field of view.

The optical system may include at least two optical elements, each of the at least two optical elements magnifying a corresponding zone of a region of interest in the field of view to a different magnification to provide magnification that varies within the image that is delivered to the image capturing system. At least one of the at least two optical elements is preferably a reflector.

In another embodiment of the invention, the image capturing system includes a sensor having a density of sensor elements that varies within the sensor to provide different spatial resolutions within the sensor, whereby the apparent size of objects in the image varies relative to the spatial resolution.

The resolution or magnification may vary discretely within at least a portion of the image. Advantageously, the captured image may include zones that correspond to regions in the field of view, wherein at least some regions overlap.

In an embodiment, the apparent magnification of the delivered image varies continuously within at least a portion of the image. Alternatively, this can be understood as having zones that approach zero size, such that the magnification varies smoothly across the field of view.

In another embodiment, the camera or image capturing system captures an infrared image.

Also disclosed herein is a camera for capturing an image for monitoring a region of interest, the camera including: an optical system which presents an image of a field of view that includes a region of interest; and a sensor adapted to capture at least a portion of the presented image; wherein the presented image includes a first magnification of the region of interest, and a second magnification of at least a portion of the region of interest, wherein a first portion of the region of interest is captured at a higher magnification, and a second portion of the region of interest being less distant than the first portion is captured at a lower magnification.

Preferably the first and second magnifications are chosen such that when an object is located at a first position in the first portion of the region of interest a captured image of the object is substantially a same size as a captured image of the object if it were located at a second position in the second portion of the region of interest that is closer to the camera than the first position. The sensor may simultaneously capture the first and second magnifications. The camera may alternatively include a selector for delivering either the first or second magnifications from the presented image to the sensor. The magnification can be achieved optically, e.g. using a combination of one or more mirrors and or lenses, or digitally using an image sensor having differing pixel densities corresponding to sensor zones able to product an image with a different digital magnification.

In some examples of the present invention each zone has near and far boundaries outside of which the scene is not captured on the respective portion of the image that corresponds to that zone, or at least is not captured and used in video motion detection. An object in the given zone will be relatively easy to identify by video motion detection when the object is at the near boundary of the zone, but the apparent magnification of the object at the far boundary will determine whether or not there is sufficient spatial resolution in the analysed image to identify the object.

In one embodiment of the invention, the apparent magnifications and the boundaries of the respective zones are selected such that a notional object of a predetermined minimum size that is located in a first zone, at the far boundary of the first zone and adjacent a relatively further, second zone, has a spatial resolution in the image such that the object can be identified by video motion detection. This avoids object identification errors or having an "invisible" region of the zone where the processor cannot identify certain objects of particular interest.

The notional object fox, may example, be a small animal, e.g. a rabbit, and the predetermined size could be in the range of 20 to 50 cm. This enables the processing system to identify by video motion detection that the object is an small animal or other non-human object, and therefore is (or is not) a threat. In a particularly advantageous embodiment, especially for security purposes, selection of the apparent magnifications and zone boundaries is such that notional object is an adult or teenage person, whereby the predetermined minimum size is, for example, 150 cm.

In many security systems, an alert or warning flagged by a video motion based monitoring system requires a person to visually confirm, by viewing a display of the image, whether the alert or warning requires an action to be taken. Thus, by having the apparent magnifications and zone boundaries appropriately selected, the person is able to confirm the identity of the object, regardless of the location of the object with a given zone, and act (or not act), as necessary.

As described herein, the zones may be mapped to corresponding portions of captured image such that there is some overlap between the zones. Advantageously, the processing system can optionally take into account motion and location information of the object in the further zone (which is at relatively high spatial resolution on the corresponding portion of the image) to assist in the identification of the object concurrently appearing at a lower resolution in overlapped part of the nearer zone. Thus, the object can be continuously identified as being the same object and can be tracked from one zone to another zone.

In another aspect of the invention, there is provided a surveillance system for monitoring movement in a region of interest, said surveillance system including: an optical system which presents an image of a field of view that includes a region of interest; and a sensor adapted to capture at least a portion of the presented image, the presented image including a first magnification of the region of interest, and a second magnification of at least a portion of the region of interest; and an image processing system configured to process a time-sequential series of images of the field of view from the image capturing system such that at least a portion of each processed image is analysed for detecting movement within the region of interest.

BRIEF DESCRIPTION OF THE DRAWINGS

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

Figure 1:
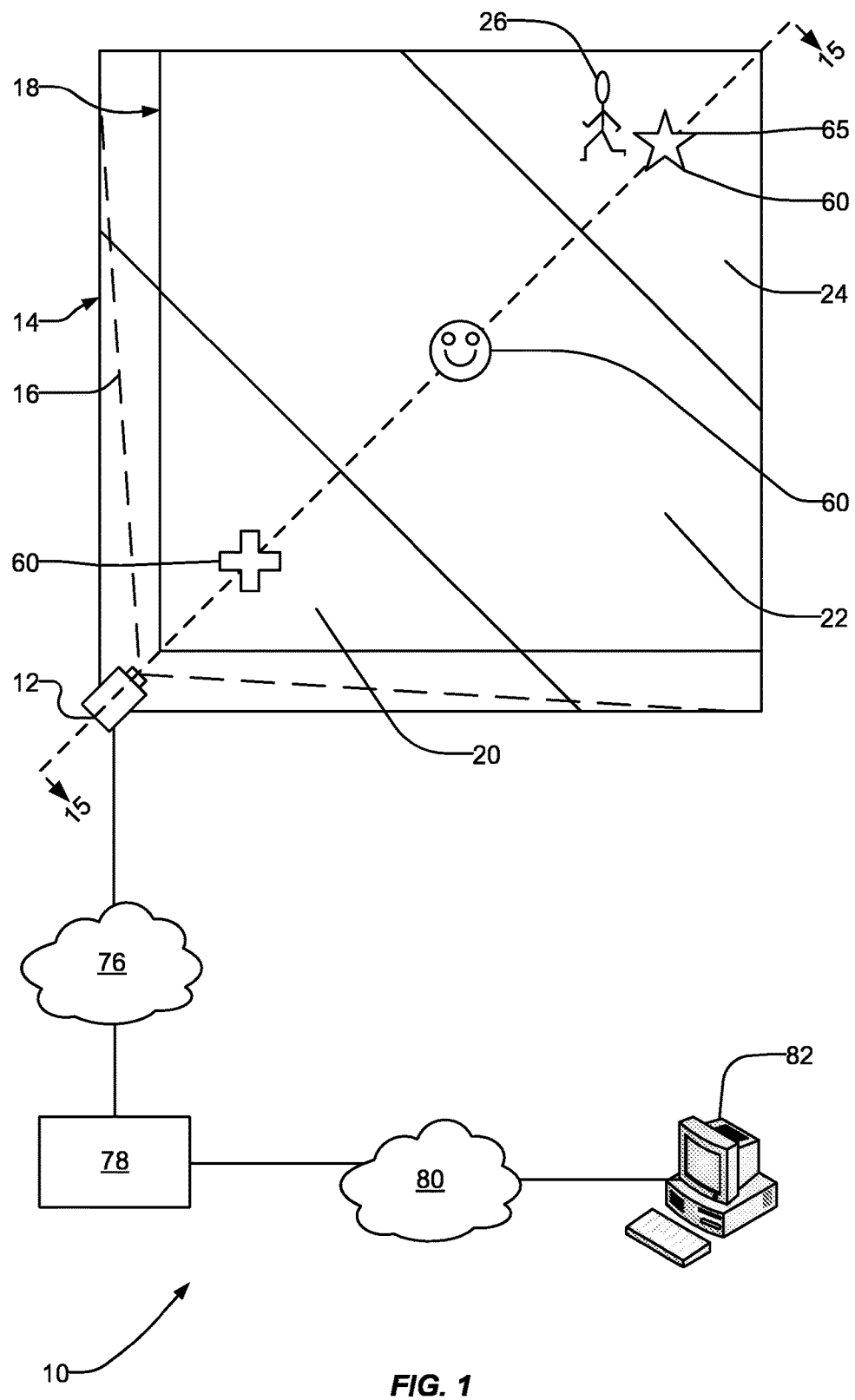
FIG. 1 is schematic plan view of a surveillance system in accordance with an embodiment of the present invention.

A surveillance system that is in accordance with an embodiment of the present invention is shown in FIG. 1. Surveillance system 10 has an image capturing system which in this embodiment is an imaging device in the form of a camera 12. The camera 12 is installed at a site 14 with boundary fence or wall fence 13, for the purpose of monitoring activity within the site. The camera has a field of view 16 for monitoring a region of interest 18 within the site 14. This is depicted in plan view in FIG. 1. The region includes a plurality of zones including a zone in the near field 20, a zone in the mid field 22 and a zone in the far field 24.

In the presently described embodiment, the camera is installed above ground at a corner location to monitor for an intruder 26 in the region of interest 18. The camera 12 captures a sequence, at predetermined intervals, of images of the field of view 16 containing the region of interest 18. The images may be used to determine whether an intruder 26 is present.

Figure 2:
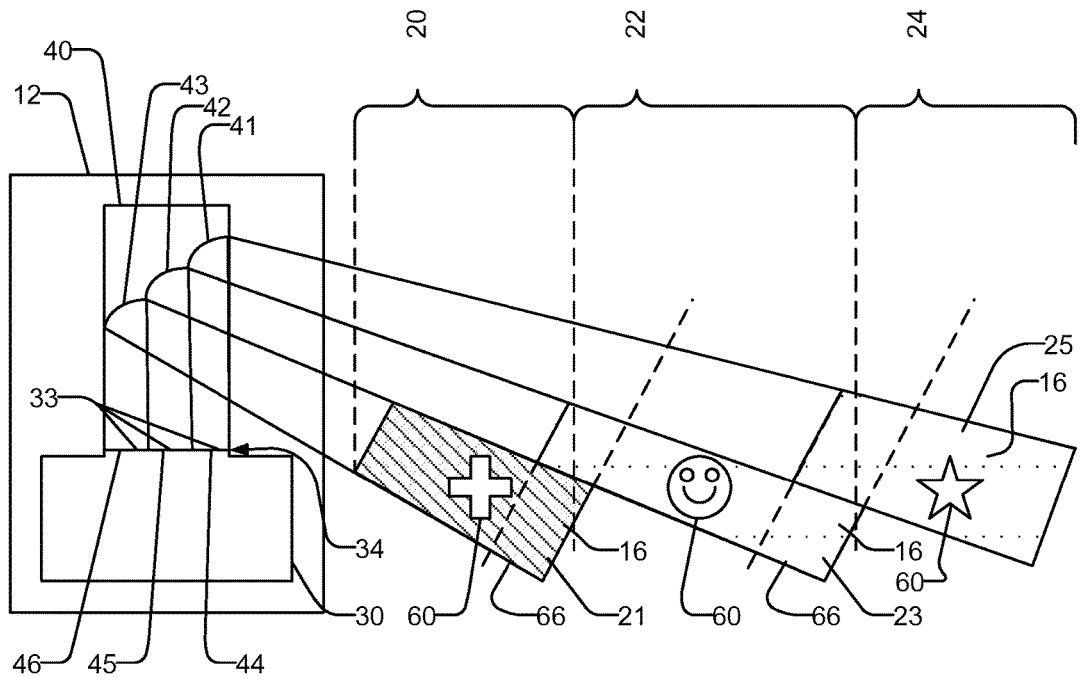
FIG. 2 shows a simplified sectional diagram along line 15-15 of FIG. 1.

FIG. 2 shows a simplified sectional diagram along line 15-15 of FIG. 1, but excluding the intruder 26. Camera 12 has sensor 34 having a pixelated image recordal surface with field of view 16 via optics 40 that includes a plurality zones 21, 23, 25, respectively located in the near field 20, mid field 22 and far field 24. The sensor 34 may be a charge-coupled diode plate, CMOS image sensor or similar. The region of interest 18 may be the entire field of view or may be only a part thereof. For example, at a particular moment, it may be that only a portion of a single zone 21, 23 or 25 is the region of interest 18. Alternatively, there may be no specific "region of interest" specified, in which case the region of interest and the field of view are one and the same.

Monitoring the site, by analysing the image, may be conducted on-site or may be achieved remotely. A particularly useful form of monitoring involves analysing a plurality of images 74 to detect motion within a region of interest 18 in the field of view 16. This analysis may be done by a human or a computer. In the latter case, Video Motion Detection (VMD) techniques are known and may be employed for this purpose, with or without human intervention. In one embodiment, images 74 are sent via communication channel 76 to an image processing system 78, which may be located remotely, but is generally located in or near site 14.

The processing system 78 conducts the VMD processing on the plurality of successive images 74 to detect an alarm condition. The processing system 78 sends information, including at least one image from the images 74 that caused the alarm, via another communication channel 80 to a user terminal 82. Based on the image, the operator may make a decision on whether or not to act on the alarm condition.

The image capturing system or camera also includes an optical system 40 which delivers the image to sensor 34. The optical system 40 magnifies each zone 21, 23, 25 by a magnification that is suited to the zone. In FIG. 2, this is shown as being achieved by having a plurality of reflectors 41, 42, 43 each of which magnifies a specific corresponding zone 21, 23 or 25. For example, the distant zone 25 in the far field 24 is magnified the most, by reflector 41, and imaged onto approximately a first third 44 of the sensor 34. The middle zone 23 in the mid field 22 is magnified moderately, by reflector 42, and imaged onto a centre third 45 of the sensor 34. The new zone 21, in the near field 20 is magnified the least, by reflector 43, and imaged onto the remaining third 46 of the sensor 34.

Figure 3:
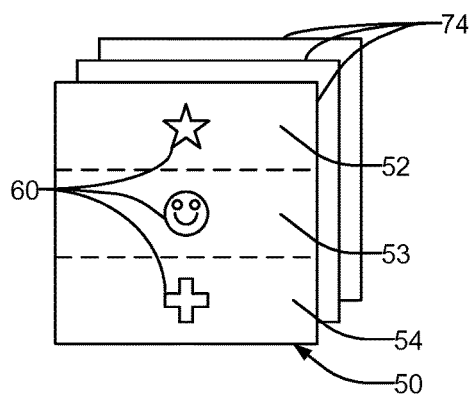
FIG. 3 is a representation of an image captured by the system of FIG. 1.

FIG. 3 schematically illustrates the resulting image 50 of three equal-sized objects 60 respectively disposed in the near field, the mid field and the far field, captured using the described variable magnification at optics 40 The image 50 is comprised of three equal sized portions 52, 53, 54 corresponding to each third 44, 45, 46 (FIG. 1) of the sensor 34, which in turn, relate to corresponding zones of the field of view. The object images all appear a similar size, as they are in reality, and the furthest object in particular can be easily distinguished and identified.

Figure 4:
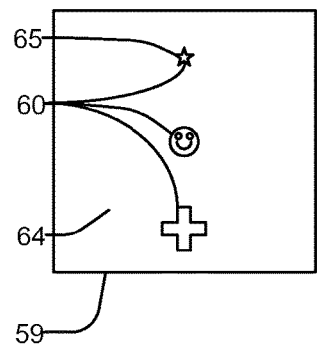
FIG. 4 is a representation corresponding to FIG. 3, showing an image of the same scene captured using a camera from the prior art.

FIG. 4, by contrast, shows an image 59 which would be captured if there were only a single or uniform magnification across the entire field of view. The image 59 shows the three equal-sized objects 60 captured in a single image. Each object 60, from the lower part image 62 to the upper part 64, is progressively further from the camera and therefore appears progressively smaller on the image, and more difficult to discern due to a lower limit on the resolution of the captured image. The image of the star 65 is difficult to see and to distinguish from other shapes; if the object image is comparable in size to the pixel size of the imagery surface, resolution of its shape is not possible.

Thus, by magnifying the different zones by appropriate amounts, an intruder in the respective zones can be captured in the image at a more consistent size across the scene, and the image is represented with sufficient pixels for reliable analysis across the entire area of the site 14 being monitored.

By having magnification increase with increasing distance of a zone, a lower resolution camera is adequate to capture an image that includes a far field zone. This improves the ease with which a high frame rate may be processed.

Furthermore the resolution and quality of the optical system 40 only needs to match the resolution of the camera, and by allowing a low resolution camera to be use the manufacturing cost is reduced. This contrasts with a reflector designed for a camera having a high pixel density which needs a high precision reflector to do justice to the higher quality sensor.

In FIG. 2 the zones 20, 22, and 24 are depicted as covering different spans of distance, but this need not necessarily be so. The zones are also shown as being overlapping, such that there exists a region 66 that belongs to adjacent zones. The overlapping region 66 allows a target to be monitored more reliably as it transitions from one zone to the next. By careful selection of magnification and degree of overlap, a typical target can appear in its entirety in the new zone before it reaches the edge of the old zone, which reduces ambiguity regarding the size and shape of the target.

Video motion detection systems used for security purposes attempt to detect moving objects, track them, and determine if they are intruders. Due to the complexity of the task, the processing power required, the limited power budgets of embedded security systems, and sometimes the sensor cost (eg infra-red sensors), many systems operate on low resolution images of 352×288 pixels or less.

If such a system captures the image of a man standing 2$m$ away, and that image is 98 pixels high, the image of that same man if he were 98 m away would be only 2 pixels high, assuming the same optical path. Although the movement of such a small target may be detectable, it is not possible for an operator viewing the image to determine distinguishing features of the man, or indeed if the target is even human because the information available to the system or operator is just 2 pixels of a particular pixel value. Furthermore, the video motion detection system, which typically relies on the size and speed of the target to discriminate between humans and animals, must be able to track an object that varies in sizes (between the most distant point in its field of view to the nearest point in its field of view) from 2 to 98 pixels high (a scale range of 49×), and which move within the corresponding speed range—i.e. the motion of an object at the farthest distance needs to be 49× faster than movement at its nearest point to appear in the image as moving at the same speed. This in turn exposes the system to false alarms from many non-human targets that fit that broad set of criteria.

As will be appreciated the invention described herein addresses both of these shortcomings. By way of example, if we consider a two-reflector system as follows:

One reflector is arranged to image targets within a field of view spanning a range of from 2 m to 14 m from the camera.

The second reflector is arranged to image targets within a field of view spanning a range from 14 m to 98 m from the camera and provides 7× the magnification of the first reflector.

If the object, when imaged by via the first reflector ranges from say 98 pixels high at 2 m, down to 14 pixels high when it is 14 m away. The second reflector, which has a comparative magnification of 7× that of the first, images the man when at 14 m as being 98 pixels high, while at 98 m the man would be 14 pixels high.

As can be seen, across the whole image captured from the dual reflector system, the man's image is never less than 14 pixels high. This presents several advantages. Firstly the man's image, even at only 14 pixels high, will be far more recognisable as being an image of a man, than the 2 pixel image of the conventional imaging system. Similarly, the video motion detection process is simplified in that the size range that the video motion detection system has to deal with is reduced from 98 m-2 m (or a scale range of 49×) down to 14 m-2 m (a scale range of 7×). This is easily within the acceptable computation loads of moderate specification systems, and also provides the operator with a more useful image for visual verification.

Figure 6:
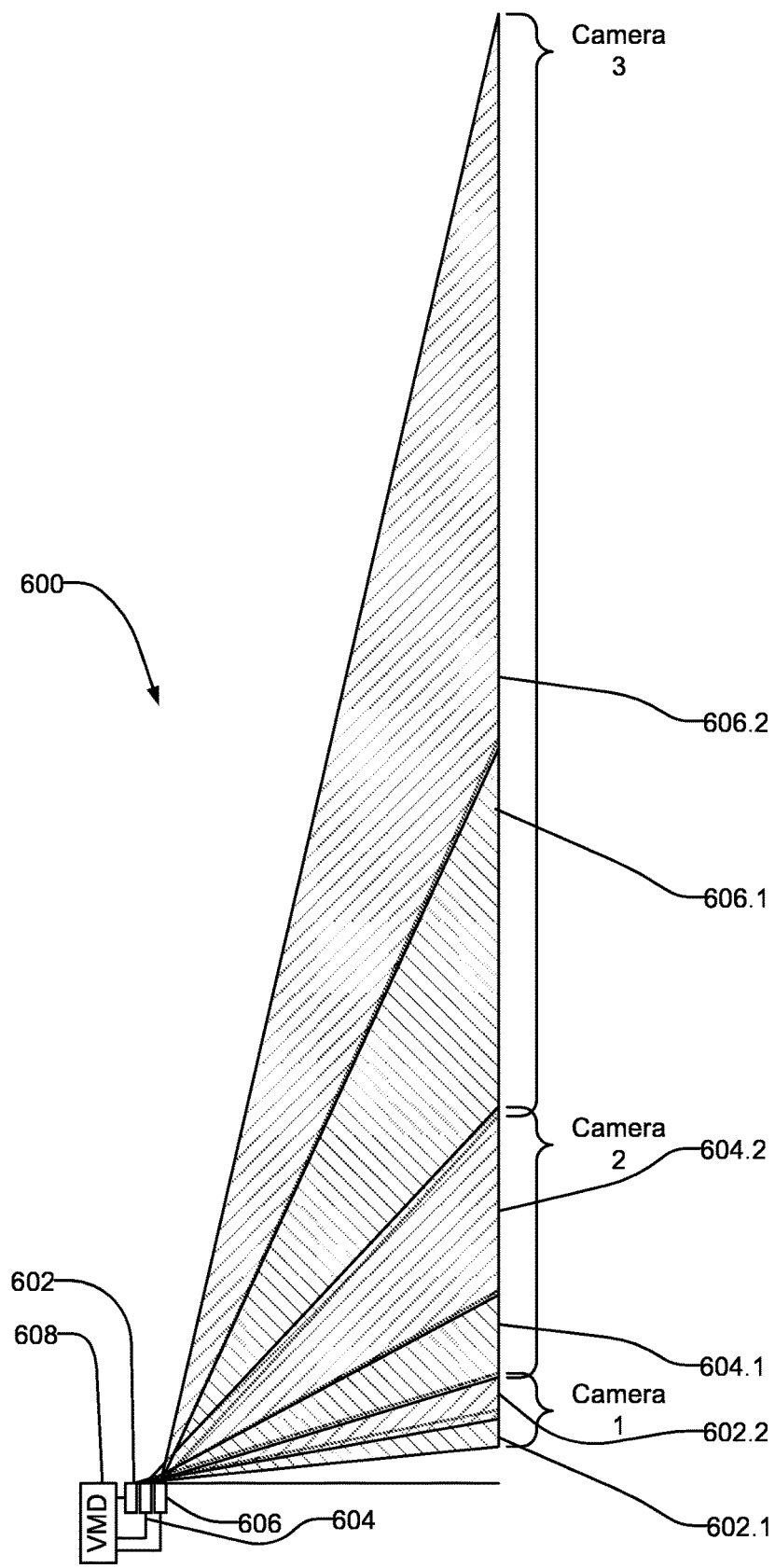
FIG. 6 illustrates a schematic side view of a further exemplary system according to an embodiment of the present invention.

Whilst this example is described in connection with an optical system configured to image the region of interest in two portions with different magnification applied to each, it should be noted that this idea can be extended to cover more regions as noted elsewhere herein. Moreover an example of an aspect of the invention can be implemented across multiple cameras, as follows:

Consider the system of FIG. 6. This system 600 includes an image capturing system including a plurality of cameras, namely cameras 602, 604 and 606 which co-operate to monitor a region of interest. The cameras 602, 604 and 606 each communicate with the a common VMD system 608. The VMD system is arranged to track motion across a region of interest spanning the field of view of the three cameras 602,604,606.

The first camera 602, has an imaging system defining:

a first zone 602.1 that captures an image of a portion of the region of interest between 5 meters and 10 meters from the camera; and a second zone 6022 that captures an image of a portion of the region of interest between 7 meters and 15 meters from the camera, with double the magnification of the optical system of the first zone.

The second camera 604, having an imaging system defining:

a third zone 604.1 that captures an image of a portion of the region of interest between 13 meters and 28 meters from the camera; and having a magnification double that of the optical system of the second zone 602.2 of the first camera 602;

a fourth zone 604.2 that captures an image of a portion of the region of interest between 25 meters and 52 meters from the camera, with double the magnification of the optical system of the third zone 604.1.

The third camera 606, having an imaging system defining:

a fifth zone 606.1 that captures an image of a portion of the region of interest between 50 meters and 100 meters from the camera; and having a magnification double that of the optical system of the fourth zone 604.2 of the second camera;

a sixth zone 606.2 that captures an image of a portion of the region of interest between 95 meters and 200 meters from the camera, with double the magnification of the optical system of the fifth zone 606.1.

In this system each zone is magnified at twice the level of the zone immediately before it and is used to image a range that approximately doubles in distance from the camera. In this way the three cameras 602, 604, 606 image a region up to 200 meters long using magnifications that vary 32× between the closest 602.1 and farthest zone 606.2.

The VMD processing system 608 that receives images from all cameras is configured to track an object as it moves from one zone to the next. Due to the optical arrangement, the size of the object being tracked in the images does not vary by more than a factor of about 2.15 within any one zone, as it moves across a zone.

In this example the plurality of cameras can be located in substantially the same location. Moreover, they may be located in a common housing so as to minimise differences in point of view when imaging the region of interest. The plurality of cameras could additionally share some optical components. Clearly different numbers of zones, magnifications and zone distances can be defined depending on requirements. These parameters can be chosen in concert with, or depending on, the video motion detection algorithm. In some instances the VMD algorithm will only cope with limited scaling of an object in the input image, and it will be necessary to select the imaging system's parameters to limit the size variation of an object in its output images to suit these limitations.

As will be seen from the above, each zone overlaps with its adjacent zone(s) by some distance, this assists the VMD algorithm in tracking an object across zone boundaries, since the object will be at least momentarily visible in the image portions corresponding to both portions of the region of interest simultaneously.

As will further be appreciated, a variation on this embodiment can use multiple cameras or a single camera with multiple image sensors, and each camera or image sensor having a find but different magnification assigned to it. Magnification can be realised either by providing suitable systems or using digital means (described elsewhere herein). In this case, as in the example above, the image captured by each camera or sensor, is joined with the other images corresponding in time with it (but derived form the other cameras or sensors), to create a composite image captured by the imaging system. This composite image is then processed by the processing system to perform video motion detection across the whole region of interest.

In another embodiment, the optics may be comprised of a reflector 70 (FIG. 5) having a continuously varying magnification across and/or along the reflector. This allows for an infinite number of zones, for which the reflector 70 provides a continuous transition from near field magnification to far field magnification across the field of view. Alternatively, this can be understood as having zones that approach zero size, such that the magnification varies smoothly across the field of view. This can reduce the requirements of the any software used to analyse the image because there are no distinct zones to map in software—the size of targets may be made truly consistent across the image. The resulting image will be distorted, but the distortion can be taken into account by any processing software or by a person viewing the image.

Such a reflector can be designed by selecting a set of concave spherical reflector portions that achieve the chosen magnification requirements at a plurality of discrete distances. This piecewise defined reflector can then smoothed either by defining a curve that interpolate between the discrete points or by blending the junctions between the individual spherical regions.

Figure 5:
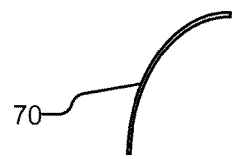
FIG. 5 shows a reflector having reflector having a continuously varying magnification.

When using the reflector of FIG. 5, it may be necessary to use a honeycomb filter in front of the sensor, or other optical device, to ensure only the rays of light from the target at the correct magnification hit the sensor.

If the VMD processing system 78 has knowledge of the specific camera from which the images have been sent, the processing system 78 can take account of the knowledge of the reflector characteristics in the optical system 40, and can be designed specifically for different applications, for example, different range requirement, or field of view requirements. Using the present invention, operator intervention is enhanced because the variable magnification allows the target to be clearly seen.

In one advantageous embodiment, the camera 12 is an infrared imaging camera. This provides valuable information, regarding the infrared spectrum, in an image format.

In another embodiment, apparent variable magnification can be provided instead of, or in addition to, the optical system by having a plurality of different sensor pixel sizes and densities in the imaging surface of the camera. For example, the pixel size is image portion 44 is made smaller than in surface portion 45 (and the pixel density correspondingly greater) so that the more distant object imaged in portion 44 has an apparent size that is magnified relative to the pixel size. In another embodiment a high resolution sensor could be used, but only part of the captured image data used for VMD analysis. For example in a portion of an image only requiring low magnification, only data from selected sensors may be read out of the image sensor, whereas in a portion of the image requiring higher magnification, a higher proportion of sensors may be read. For example in the first portion of the image every fourth line of pixel data is used, and the rest not processed, whereas in a second portion of the image all lines of pixels of data are processed. Thereby producing an image having 2 levels of digital magnification, but limiting image size and processing requirements for the VMD algorithm. Pixel selection need not be line by line, but may be performed according to algorithms similar to halftoning or dithering algorithms used for image reproduction. A more effective result can be produced by averaging pixel outputs over several pixels in low magnification image portions, and not averaging or averaging less pixels in higher magnification image portions, prior to sending an image to the VMD process. The number of zones, and how pixels are chosen or processed can be performed according to many algorithms which can be determined by those skilled in the art. Theses arrangements can be viewed as variable digital magnification at the sensor 34.

In another aspect of the invention, the camera or image capturing system includes an optical system which presents an image of a field of view that includes a region of interest. There is also included a sensor that is adapted to capture at least a portion of the presented image. The presented image includes a first magnification of the region of interest, and a second magnification of at least a portion of the region of interest. In one embodiment, the sensor simultaneously captures the first and second magnifications. This allows for capturing of multiple magnifications of the same (nominal) distance from the camera. The camera may alternatively include a selector for delivering either the first or second magnifications from the presented image to the sensor. This aspect of the invention allows for the capturing, either simultaneously or sequentially, of multiple magnifications without having to adjust a lens of a camera. For example, a system with multiple magnifications of the same scene or region of interest needs only use the magnification that best suits its algorithm.

In another aspect of the invention, there is provided a surveillance system for monitoring movement in a region of interest. The surveillance system includes the immediately abovementioned camera or image capturing system, and further includes and an image processing system configured to process a time-sequential series of images of the field of view from the image capturing system such that at least a portion of each processed image is analysed for detecting movement within the region of interest. This allows a VMD system to detect objects of different size, but at the same distance, while detecting both objects are similar resolutions. For example, trucks, cars, people and animals could be detected with one minimum and/or maximum size constraint, expressed in pixels.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A surveillance system for monitoring movement in a region of interest, said surveillance system including:
one or more cameras having a field of view including a region of interest, and adapted to capture an image of the region of interest, wherein the one or more cameras is configured such that each image includes at least two portions, said portions being captured at different apparent magnifications for at least a pair of corresponding zones within the region of interest in the field of view that are at different distances from the one or more cameras, such that an object in a first position in a first zone will appear in an image as having substantially the same size that an image of the object would if the object were in a second position in a second zone, said first and second positions being at different distances from the one or more cameras;
a computer processor configured to process a time-sequential series of images of the field of view from the one or more cameras such that at least a portion of each processed image is analyzed for detecting movement within the region of interest whereby an object's motion is tracked as it passes from one zone to another.

2. The surveillance system of claim 1, wherein the one or more cameras captures an infrared image.

3. A surveillance system for monitoring movement in a region of interest, said surveillance system including:
one or more cameras having a field of view including a region of interest, and adapted to capture an image of the region of interest, wherein the one or more cameras is configured such that each image includes at least two portions that are captured at different apparent magnifications for at least a pair of corresponding zones within the region of interest in the field of view that are at different distances from the one or more cameras, said zones being partly non-overlapping;
a computer processor configured to process a time-sequential series of images of the field of view from the one or more cameras such that at least a portion of each processed image is analyzed for detecting movement within the region of interest whereby an object's motion is tracked as it passes from one zone to another.

4. A surveillance system as claimed in claim 3, wherein the corresponding apparent magnification of images of the zones are chosen such that a motion of an object within a plurality of zones results in a predetermined limited variation in the size of an image of the object.

5. The surveillance system of claim 3, wherein the one or more cameras captures an infrared image.

6. A surveillance system for monitoring movement in a region of interest, said surveillance system including:
one or more cameras having a field of view including a region of interest, and adapted to capture an image of the region of interest, wherein the one or more cameras is configured such that each image includes at least two portions being captured at different apparent magnifications for at least a pair of corresponding zones within the region of interest in the field of view that are at different distances from the one or more cameras, said one or more cameras being configured such that a relative location, geometry of the zones and the corresponding apparent magnification of images of the zones are chosen such that a motion of an object within a plurality of zones results in a predetermined limited variation in the size of an image of the object;

a computer processor configured to process a time-sequential series of images of the field of view from the image capturing system such that at least a portion of each processed image is analyzed for detecting movement within the region of interest.

7. A surveillance system as claimed in claim 6, wherein the computer processor is configured such that an object's motion can be tracked as it passes from one zone to another.

8. A surveillance system as claimed in claim 6, wherein the one or more cameras is configured such that the apparent magnifications of at least a pair of neighboring zones within the region of interest in the field of view that are at different distances from the one or more cameras, is such that an object in a first position in a first zone will appear in an image as having substantially the same size that an image of the object would if the object were in a second position in a second zone, said first and second positions being at different distances from the one or more cameras.

9. A surveillance system as claimed in claim 6, wherein the one or more cameras is configured such that a first zone which is further from the one or more cameras has a greater magnification than a second zone that is closer to the one or more cameras.

10. A surveillance system in accordance with claim 6, wherein the one or more cameras further includes an optical system that delivers the image to be captured to the one or more cameras, the optical system magnifying at least a portion of the field of view.

11. A surveillance system in accordance with claim 10, wherein the optical system includes at least two optical elements, each of the at least two optical elements magnifying a corresponding zone of the field of view to a different magnification to provide magnification that varies within the image that is delivered to the one or more cameras.

12. A surveillance system in accordance with claim 11, wherein at least one of the at least two optical elements is a reflector.

13. A surveillance system in accordance with claim 6, wherein the one or more cameras includes a sensor having a density of sensor elements that varies within the sensor to provide different spatial resolutions within the sensor.

14. A surveillance system in accordance with claim 6, wherein the captured image includes portions that correspond to zones within the region of interest in the field of view of the imaging system which are partially non-overlapping.

15. A surveillance system in accordance with claim 6, wherein the one or more cameras captures an infrared image.

16. The surveillance system of claim 6, wherein the predetermined limited variation is chosen to enable video motion detection to be performed as an object moves into a new zone within the plurality of zones.

17. The surveillance system of any one of claim 6, wherein the predetermined limited variation is chosen such that an image of an object is sufficiently large to enable detection of the presence of the object, in a portion of the image corresponding to a new zone within the plurality of zones when the object moves into the new zone.

18. The surveillance system of any one of claim 6, wherein the predetermined limited variation is chosen such that an image of an object is sufficiently large to enable identification the object in a portion of the image corresponding to a new zone within the plurality of zones when the object moves out of a previous zone.

19. The surveillance system of claim 6, wherein the one or more cameras includes a plurality of cameras, each camera having a field of view that covers part of the field of view of the plurality cameras, said plurality of cameras being further configured to capture at least one respective portion of the image of the region of interest at at least one corresponding respective apparent magnification.

20. A surveillance system in accordance with claim 6, wherein the one or more cameras includes a sensor having a plurality of sensor elements, wherein different sets of sensor elements correspond to different portions of an image to be captured at a corresponding apparent magnification, and wherein the one or more cameras is arranged to selectively process data from sensor elements within each set of sensor elements according to the apparent magnification of the portion of the image.

* * * * *